United States Patent [19]
Kaplan

[11] Patent Number: 5,672,864
[45] Date of Patent: Sep. 30, 1997

[54] LIGHT INTEGRATOR

[75] Inventor: Martin Charles Kaplan, Rochester, N.Y.

[73] Assignee: Eastman Kodak Company, Rochester, N.Y.

[21] Appl. No.: 606,671

[22] Filed: Feb. 26, 1996

[51] Int. Cl.$^6$ ........................................... H01J 3/14
[52] U.S. Cl. ........................ 250/227.28; 250/227.31; 250/234
[58] Field of Search ............. 250/227.28, 227.29, 250/227.31, 227.32, 234, 235, 236

[56] References Cited

U.S. PATENT DOCUMENTS

| | | | |
|---|---|---|---|
| 4,376,576 | 3/1983 | Snelling | 250/227.28 |
| 4,827,126 | 5/1989 | Tanaka | 250/227.31 |
| 4,835,057 | 5/1989 | Bagley et al. | 428/391 |
| 4,868,383 | 9/1989 | Kurtz et al. | 250/228 |
| 5,241,459 | 8/1993 | Kaplan et al. | 362/298 |
| 5,257,340 | 10/1993 | Kaplan | 385/128 |
| 5,274,228 | 12/1993 | Kaplan | 250/227 |
| 5,448,289 | 9/1995 | Yoshizawa et al. | 348/98 |
| 5,596,160 | 1/1997 | Li et al. | 250/236 |

*Primary Examiner*—Edward P. Westin
*Assistant Examiner*—Kevin Pyo

*Attorney, Agent, or Firm*—Gordon M. Stewart

[57] ABSTRACT

A light integrator in a first aspect, comprises:

an elongated tapered solid core having first and second ends and an elongated surface therebetween, down which a decreasing total proportion of light can propagate by total internal reflection at the elongated surface;

a layer of reflective material positioned adjacent at least a portion of the elongated surface, which reflective layer is of a first material having sufficient porosity, with pores which are vacant or contain a second material having an index of refraction lower than that of the core, such that the layer reduces total internal reflection in the core less than it would be reduced using a non-porous layer of the same dimensions of only the first material; and first and second light ports defined by regions of the core not covered by the reflective material, positioned such that light can pass through the first port, propagate down the core by total internal reflection at the elongated surface, while an increasing total proportion passes through the elongated surface to be reflected by the reflective material and escape through the second port.

A scanner is also provided which uses a light integrator of the present invention in a light source or as a light collector.

21 Claims, 4 Drawing Sheets

LIGHT INTEGRATOR

FIELD OF THE INVENTION

The invention relates to a light integrator useful for a light source or light collector, and which is of relatively simple construction.

BACKGROUND OF THE INVENTION

For many applications, it is desirable to have a uniform light beam of some particular shape, or it may be desirable to have a light collector which collects light from a beam of some particular shape. For example, in film digitizers, linear light sources and collectors have been employed frequently. A telecine film scanner typically includes a linear CCD image sensor which provides a serial output of signals representing successive pixels of an image illuminated by a linear light source. For color applications, the film scanner can include an assembly of three separate CCD image sensors, one for each of the primary colors. The film is driven at a uniform rate past a linear light source, and an illuminated line of the film is imaged onto each CCD image sensor. The film motion provides the frame scan, and the linear cycling of the elements in the image sensor provides the line scan. A scanner of this type is disclosed in U.S. Pat. No. 4,205,337.

The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g., scratches, will appear in an image produced from the scanned information.

It is also known in film scanners to use large, air filled integrating cylinders with a port in the cylinder wall into which light can be introduced. This light then multiply reflects within the cylinder to randomize the light distribution. This randomization produces uniform, diffuse light within the cylinder, which then exits through a long, narrow exit slit to produce a stripe of uniform, diffuse illumination when used as a linear light source. Alternatively, when used as a light collector, light can enter the narrow slit and exit the port.

U.S. Pat. No. 5,274,228 and U.S. Pat. No. 5,257,340 disclose excellent linear light source devices, which can be used in reverse as light collectors as described in those patents. By tailoring the dimensions of a reflective strip on the rod, it is possible to achieve a desired brightness profile along its length. However, the device disclosed in U.S. Pat. No. 5,274,228 uses a rod located inside a cavity within which light is reflected. Such a cavity increases the size of the device and the cost. U.S. Pat. No. 5,257,340 on the other hand, discloses a compact rod arrangement with a cladding coated over an internal core to provide internal reflection, followed by a reflective layer. However, coating the core with a cladding layer having the necessary properties followed by a coating with a reflective layer, is a relatively complex task.

It would be desirable, then, to provide a device which can provide a uniform light source for use in such applications as a scanner, or which can be used to collect light, which device can be readily tailored during construction for providing light of a given spatial profile or receiving light with a given spatial responsivity, and which is of relatively simple construction.

SUMMARY OF THE INVENTION

The present invention is based on the discovery that a device similar to that of U.S. Pat. No. 5,257,340 can be constructed but that by appropriately shaping the core within which internal reflection takes place, it is not necessary to provide a scattering region. The present invention further realizes that even the cladding layer described therein can be omitted and instead a reflective layer used which meets specific characteristics.

A first aspect of the present invention provides a light integrator comprising:

an elongated tapered solid core having first and second ends and an elongated surface therebetween, down which a decreasing total proportion of light can propagate by total internal reflection at the elongated surface;

a layer of reflective material positioned adjacent at least a portion of the elongated surface, which reflective layer is of a first material having sufficient porosity, with pores which are vacant or contain a second material having an index of refraction lower than that of the core, such that the layer reduces total internal reflection in the core less than it would be reduced using a non-porous layer of the same dimensions of only the first material; and first and second light ports defined by regions of the core not covered by the reflective material, positioned such that light can pass through the first port, propagate down the core by total internal reflection at the elongated surface, while an increasing total proportion passes through the elongated surface to be reflected by the reflective material and escape through the second port.

In a second aspect of the present invention, the layer of reflective material, instead of meeting the above requirement regarding porosity, may simply be any layer which, along the length of the core, reduces total internal reflection less than the tapering of the core reduces total internal reflection.

In a third aspect of the present invention, the layer of reflective material can, instead of being positioned adjacent the elongated surface, simply be positioned over it (that is, there can be a space of up to 10 mm, 20 mm or even more). In this case, the reflective layer instead of meeting the above requirement regarding porosity, can be any reflective material. Further, while in the first two aspects the core may be of any shape provided it meets the requirements stated, in the third aspect the shape of core is chosen to be not rotationally symmetric and the elongated surface has a straight line portion extending in the longitudinal direction.

The present invention also provides a scanner using a light integrator of the present invention.

The light integrator of the present invention can provide a uniform light source or can be used to collect light, for use in such applications as a scanner. The element can be very readily constructed and readily tailored during construction for providing light of a given spatial profile or receiving light with a given spatial responsivity, and does not require a cladding layer.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1:
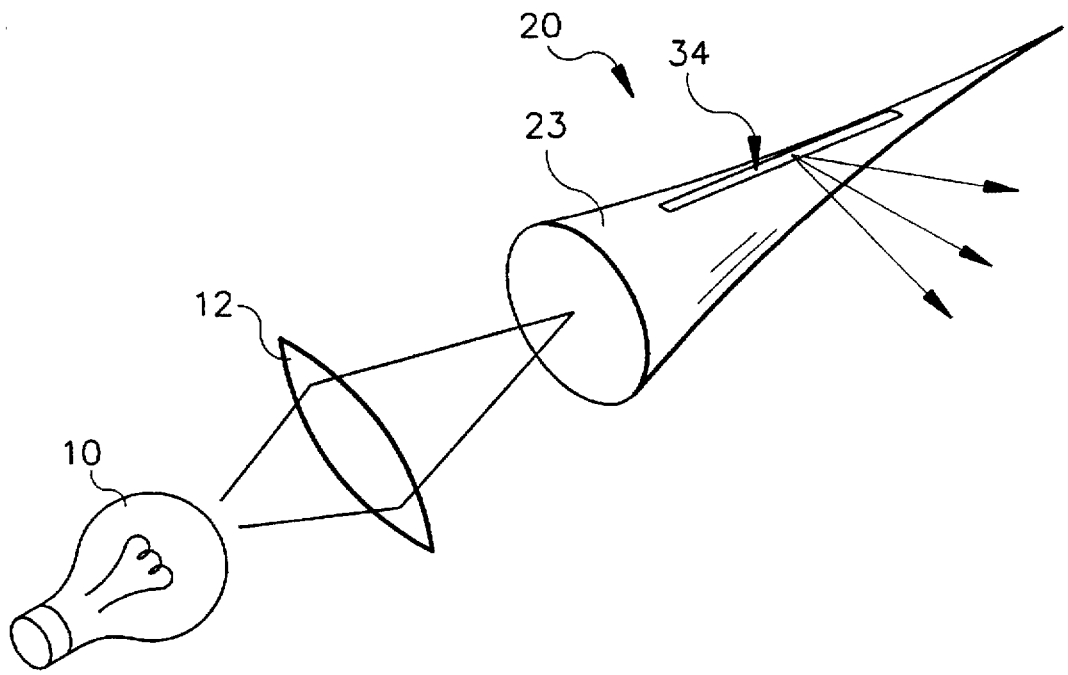
FIG. 1 is a perspective view of one light integrator of the present invention showing use with a light source.

With reference to a layer being adjacent the surface of the light transmitting medium, this means that while it need not be contacting that surface it will be within a few wavelengths of the surface so that it would affect total internal reflection in the light transmitting medium absent the required porosity. However, normally it will be contacting the surface. With reference to a layer of reflecting material being immediately adjacent or immediately over a portion of an internally reflecting surface, these mean it will be in contact with such surface with no intervening layers. It will also be understood that the "light integrator" of the present invention includes the possibility of its use as a light collector. Thus, even though the light integrator of the present invention may be defined with reference to a light traveling in a particular path, it will be understood that in use the light may actually be traveling in a reverse path.

It is preferred that the reflective layer is positioned adjacent the elongated surface of the core. In such case, the reflective layer along the length of the core, reduces total internal reflection (TIR) less than TIR is reduced by the tapering of the core. This requirement ensures that TIR is not unduly interrupted. This is preferably accomplished by the reflective layer having a sufficient porosity and with pores which are vacant or contain a second material having an index of refraction lower than that of the core, such that the layer reduces total internal reflection in the light core less than it would be reduced using a non-porous layer of the same dimensions of only the first material.

By using a reflective layer having one of the foregoing characteristics, it is not necessary to have a cladding layer between the core and the reflective layer. However, a less preferred form of the present invention includes the possibility of using such a cladding layer with a reflective layer not meeting either of the foregoing characteristics.

The pores of the layer can contain various materials particularly of a lower index of refraction than the remainder of the layer or the core, but may particularly be a gas such as air. For a reflective layer with the required porosity, many types of different materials can be used. For example, most white powders would be suitable when moderately packed adjacent the surface, there being air pores between the powder grains. Examples of such powders particularly include a barium salt (preferably barium sulfate) powder. The powder can be adhered to the surface by suitable means such as an adhesive carrier, for example in the form of a paint (and hence will be immediately adjacent to the surface), or held adjacent the surface by other means. However, when the powder is adhered to the surface by means of an adhesive carrier, the properties may vary from the packed powder depending upon the carrier. Therefore, a powder in a carrier (such as a paint) should be checked again for the property of not reducing internal reflection in the light carrying medium too much even though the packed powder itself has been previously tested and found to have the necessary properties.

One easy way to test any particular reflective material is to coat it on the elongated surface of a solid rod made of the material of the light carrying medium and observe through the end of the rod whether the material is visible. The more visible the material, the less suitable it would be as a layer of the required reflective material. If the reflective material does not disrupt the TIR then a total internal reflected image of the other end of the rod is observed. If quantitative measurements are desired, this can be done by measuring the percent transmission of diffuse light through the coated rod.

As to the core construction, the first end of the core may particularly have a first lateral face (that is, at an angle to the longitudinal direction).

Figure 2A:
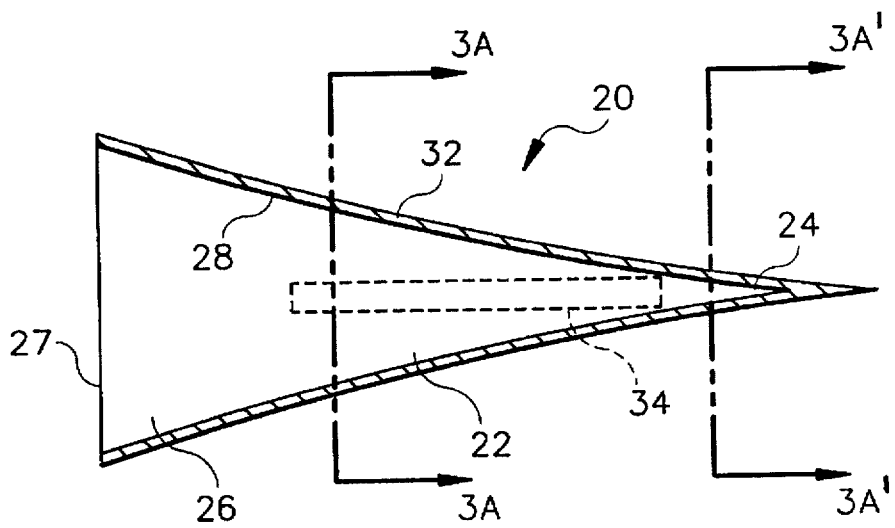
FIG. 2A is longitudinal cross-section of the light integrator of FIG. 1.
Figure 2B:
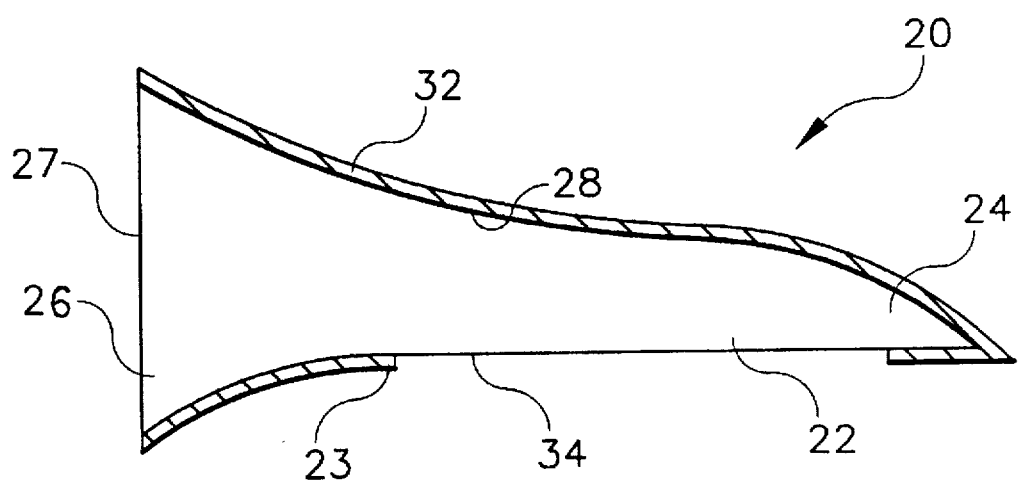
FIG. 2B is another longitudinal cross-section of the light integrator of FIG. 1 but at 90 degrees to the cross-section of FIG. 2.
Figure 3A:
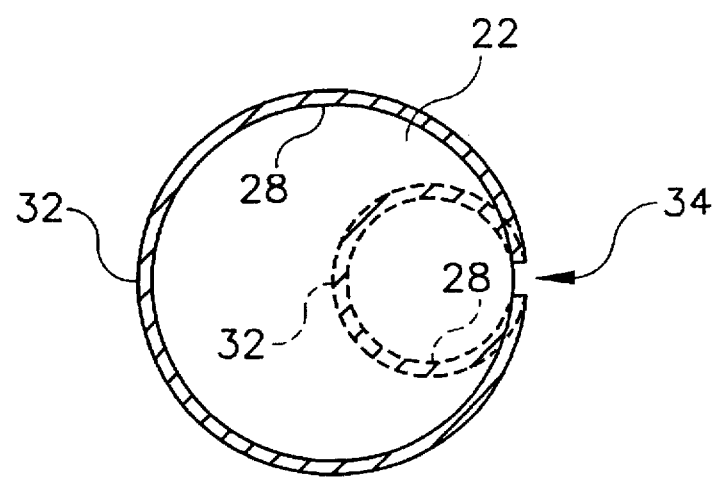
FIG. 3A is a lateral cross-section along line 3A—3A of FIG. 2A, with a second lateral cross section taken at a different longitudinal position being shown in broken lines.
Figure 3B:
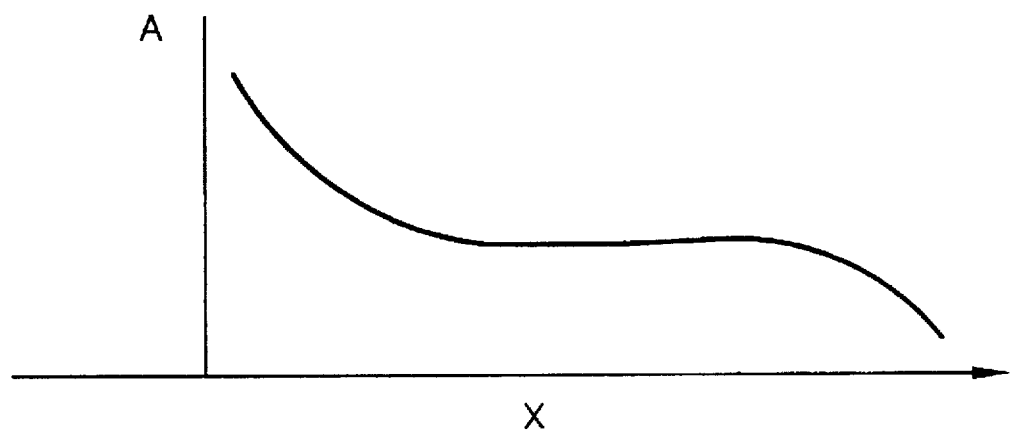
FIG. 3B is a graph showing cross-sectional area of the core of the light integrator of FIGS. 1 to 3A as a function of longitudinal position.

Referring now to FIGS. 1 to 3 in particular, there is shown a light integrator 20 having a solid central core 22. Core 22 tapers from the first end 26, carrying a flat end face 27 (which is a first light port) to second end 24 in a manner best seen in FIGS. 2A, 2B and 3A, and has circular cross-section at every position along its length (as particularly best seen in FIG. 3A). It will be appreciated though, that end face 27 need not necessarily be flat and that core 22 could have a lateral cross-section of shapes other than circular. Also, second end 24 need not be a point but could include other shapes such as a flat surface. Note that the broken lines shown in FIG. 3A represent a lateral cross-section along line 3A'—3A' in FIG. 2A. An elongated surface 28 extends between first and second ends 26, 24. As can be seen from FIGS. 2B and 3A in particular, core 22 is not rotationally symmetric, and has a straight line portion 23 extending in the longitudinal direction. The lateral cross-sectional area, "A", at any given position "X" along the longitudinal direction of core 22, is shown in FIG. 3B. It will be appreciated though that core 22 may be rotationally symmetric, and that further it need not have a straight line portion 23.

Core 22 is made from any suitable light transmitting material such that light can be propagated down it by TIR, reflecting off elongated surface 28. Particular materials include glass, plastic, quartz or fused silica. In situations where it is desired to avoid a relatively high light absorption in the blue region of the visible spectrum, such as for a typical color film scanner, core 22 should be of a material such as glass, quartz or fused silica. However, for applications where it is not necessary that core 22 has low light absorption in the blue region, it is preferred that core 22 be of a plastic (that is, a synthetic polymer) since the desired shape can be readily obtained by molding, extruding, or other suitable plastic forming operations.

A reflective paint layer 32 is positioned immediately over (that is, contacting the surface of core 22 without any intervening layer) all of elongated surface 28, except a narrow elongated slit 34 (which is a second light port) along the longitudinal direction of core 22. It will be noted that slit 34 is elongated along straight line portion 23. End face 27 and slit 34, which are both regions of the core not covered by layer 32, define first and second light ports through which light can pass into or out of light integrator 20. It will be appreciated that reflective layer 32 need not necessarily cover all of elongated surface 28. As well, reflective layer 32 could also cover part of end face 27.

It is preferable in the present invention, that reflective layer 32 have the required property of causing low disruption of TIR inside core 22. By "low disruption" in this context, is meant that along the length of the core, the layer reduces total internal reflection less than is reduced by the tapering of the core. Preferably, this references a layer of a first material which has sufficient porosity with the above defined pores, such that the layer reduces total internal reflection in the light core less than it would be reduced using a non-porous layer of the same dimensions of only the first material. Such materials may be found among reflective materials of the type described above. Suitable materials are very readily determined using the test described above. For illustration, the multitude of suitable powdered materials which have the necessary properties when simply packed around the core include barium sulfate powder, table salt, granulated sugar and even powdered coffee whitener. However, it is preferable that for simplicity the reflective layer be a painted layer 32 shown. The paint is a white powder in a carrier, and adheres to surface 28 when dry. It appears that the type and amount of carrier may affect whether the final dry layer has the desirable low effect on TIR, even if the packed powder material of the paint by itself may have the desirable low effect. Again, in each case the proposed final layer should be tested for its effect on TIR in a manner such as described above since not all layer constructions can be used. Two particularly useful paints contain barium sulfate in a carrier, namely KODAK WHITE REFLECTANCE COATING available from Eastman Kodak Company, Rochester, N.Y., and SPECTRAFLECT available from Labsphere P.O. Box 70, North Sutton, N.H. 03260. In the first case the carrier includes alcohol/water/a small quantity of polyvinyl alcohol. Also, all the packed powders of the type already described could be used. The following commercially available paints were found not to provide low disruption of TIR: three titanium compound containing paints, a zinc compound containing paint, a lead carbonate/zinc oxide paint, and "KRYLON Flat White #1502" have not been found useful.

It is not necessary that the reflective layer 32 have the low disruption of TIR property described above. However, in the case where layer 22 is of a material which does not have such property (such as the three types of paints mentioned above), to avoid undue disruption of TIR it would then be desirable to coat a cladding layer of an index of refraction lower than core 22 between the elongated surface of the core, and reflective layer 32. The use of such cladding layers is described in U.S. Pat. No. 5,257,340. Other paints which can be used in this case would then include those that were not suitable above, in particular: "Golden Airbrush Colors Titanium White" (Golden No. 08380), "Golden Acrylics Titanium White" (Golden No. 01380), both from Golden Artist Colors, Inc., New Berlin, N.Y. 13411; "CREATEX Opaque White Airbrush" from Createx, East Granby, Conn. 06026; "Winsor & Newton Designers Gouache Zinc White" (Part No. 0605-748), "Winsor & Newton Oil Colour Flake White" (Part No. 1414-245), both available from the Winsor & Newton division of Colart Americas, Piscataway, N.Y. 08855; and the "KRYLON Flat White 1502" mentioned above, from Krylon division of Sherwin-Williams, Solon, Ohio 44139.

A particularly convenient method of manufacturing light integrator 20 is to first form core 22 by any suitable method, such as casting. A mask is then applied over end face 27 and a mask applied over surface 28 in the shape of the desired slit 34. The entire assembly can then be exposed to a paint which, when dry, will have the necessary reflective and low disruption of TIR qualities. The two masks can then be removed leaving end face 27 and slit 34 as the two light ports.

Figure 3C:
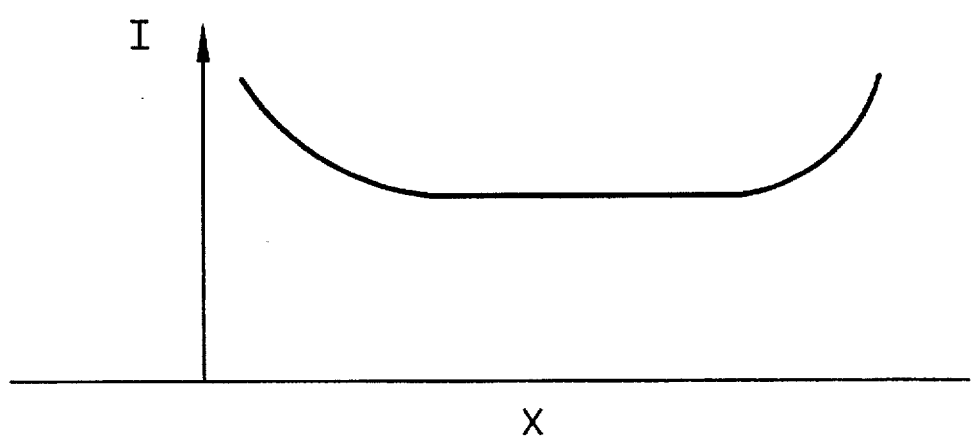
FIG. 3C is a graph showing light intensity at the second port of the light integrator of FIGS. 1 to 3A, as a function of longitudinal position, when the light integrator is used as light source.

The operation of the light integrator of FIGS. 1–3, as a light source, is as follows. An electrically powered light source 10 is positioned to direct light through a lens 12 and into face 27 (now acting as an entry light port of core 22). The light then propagates down core 22 by TIR. Reflecting layer 32, being of the type described, does not substantially interrupt this TIR. However, due to the tapered shape of core 22, as light proceeds down the core (that is, from the first end 26 to the second end 24) a proportion of it will escape through elongated surface 28 as non-TIR light. The reason the light escapes is because it cannot be indefinitely concentrated to smaller and smaller areas. As explained in the book "High Collection Nonimaging Optics" by W. T. Welford and R. Winston, Academic Press, 1989, the light responds by violating TIR and leaking out the elongated surface 28. This resulting non-TIR light will then be diffusely reflected repeatedly back into core 22 by reflective layer 32 until eventually exiting through slit 34 (which now acts as an exit light port). The light will have been multiply diffusely reflected inside core 22 (although neither multiple reflections nor diffuse reflections are necessary) by layer 32 before exiting through slit 34. A highly diffuse light will emerge from slit 34 whose light intensity distribution along the longitudinal direction is largely determined by the shape (that is, the particular type of tapering) of core 22 and the positioning of slit 34. With a core of the shape best shown in FIGS. 2A, 2B, 3A, and 3B, the light intensity distribution will be brighter at the ends of slit 34 than in the middle, as shown in FIG. 3C (in which "I" is light intensity at any given longitudinal position "X" along slit 34). The most important aspect which determines this intensity distribution is the manner in which the cross-sectional area of the core varies along its length, such as depicted in FIG. 3B. Such an intensity distribution compensates for optical falloff in scanner optics, such as vignetting and $\cos^4\theta$ falloff, as is known. Different intensity profiles are readily achieved by altering the taper of core 22.

Additionally, if desired in the present invention, various scattering areas can be incorporated onto surface 28, or scattering centers can be incorporated into the volume of core 22. A scattering area can, for example, be a ground area on a portion of elongated surface 28 beneath reflective layer 32. The scattering centers can, for example, be voids or small particles. The density distribution of scattering areas or centers may be varied along the length of core 22 to control the output profile through slit 34.

It will be appreciated that light integrator 20 can be used in reverse from the manner described above as a light source, to provide a light collector.

Figure 4:
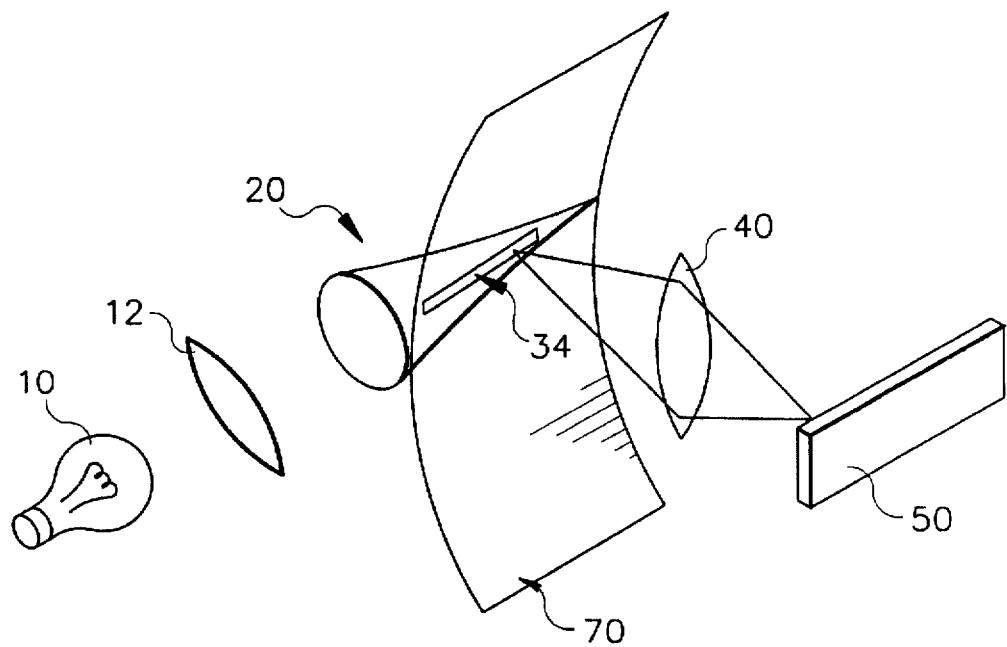
FIG. 4 illustrates a scanner of the present invention using a light integrator of the present invention as a light source.

FIG. 4 illustrates a film scanner of the present invention using the light integrator arrangement shown in FIGS. 1–3 as a light source. An electric lamp light source 10 will be focused by a lens 12 onto face 27 as shown in FIG. 1 and described above. The diffuse light will leave through slit 34 and illuminate a medium, such as film 70, held in place by a media holder (not shown) to receive light from slit 34. This illuminated stripe of film 70 is then imaged through a lens system 40 onto a linear sensor 50, such as a CCD array, which converts the scanned image into a sequence of signals corresponding to the image. By moving the film 70 vertically past the exit slit 34, a full image frame on the film 70 can be scanned. It will be noted that straight line portion 23 permits a relatively flat slit 34. This allows film 70 to lie flat and near the entire length of slit 34.

Figure 5:
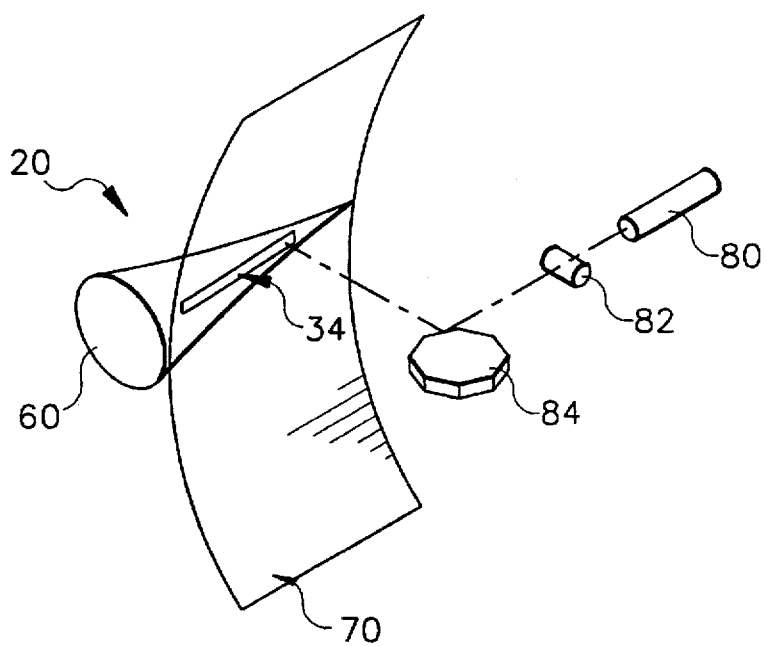
FIG. 5 illustrates another scanner of the present invention using a light integrator of the present invention as a light collector.

FIG. 5 illustrates the use of light integrator 20 as a linear light collector used to collect a laser light beam passing through and modulated by the optical density of the image on a medium, such as film 70 (again, held in place by a suitable media holder). Such film scanners may, for example, be used to scan radiographic images recorded by X-ray or the like on transparencies in order to provide a digital record for storage, to transmit to remote locations, and to conduct image enhancement and analysis. In FIG. 5 a laser light source 80 is imaged by a lens system 82 onto the facets of a rotating mirror 84 which deflects the beam in a scanning line onto the film 70. The scanned beam traverses the film 70, and the light transmitted through the film 70 enters the slit 34 of light integrator 20. Light integrator 20 functions inversely to its use as a linear light source described above. Light collected is directed to end face 27 which is covered by a light detector 60 which converts the signal received into a corresponding electrical output. In this manner each frame of film 70 can be converted to a sequence of signals corresponding to the image on it.

It will also be appreciated that the scanner of the present invention can have its media holder and other components positioned to scan a reflective medium (such as a photographic print) in a known manner.

The invention has been described with reference to a preferred embodiment. However, it will be appreciated that variations and modifications can be effected by a person of ordinary skill in the art without departing from the scope of the invention.

| PARTS LIST | |
|---|---|
| 10 | Light Source |
| 12 | Lens |
| 20 | Light Integrator |
| 22 | Core |
| 23 | Straight Line Portion |
| 24 | Second End |
| 26 | First End |
| 27 | End Face |
| 28 | Elongated Surface |
| 32 | Reflective Layer |
| 34 | Slit |
| 40 | Lens System |
| 50 | Linear Sensor |
| 60 | Light Detector |
| 70 | Film |
| 80 | Light Source |
| 82 | Lens System |
| 84 | Rotating Mirror |

I claim:

1. A light integrator comprising:
an elongated tapered solid core having first and second ends and an elongated surface therebetween, down which a decreasing total proportion of light can propagate by total internal reflection at the elongated surface;
a layer of reflective material positioned adjacent at least a portion of the elongated surface, which reflective layer is of a first material having sufficient porosity, with pores which are vacant or contain a second material having an index of refraction lower than that of the core, such that the layer reduces total internal reflection in the core less than it would be reduced using a non-porous layer of the same dimensions of only the first material; and
first and second light ports defined by regions of the core not covered by the reflective material, positioned such that light can pass through the first port, propagate down the core by total internal reflection at the elongated surface, while an increasing total proportion passes through the elongated surface to be reflected by the reflective material and escape through the second port.

2. A light integrator comprising:
an elongated tapered solid core having two ends and an elongated surface therebetween, down which a decreasing total proportion of light can propagate by total internal reflection at the elongated surface;
a layer of reflective material positioned adjacent at least a portion of the elongated surface and which, along the length of the core, reduces total internal reflection less than the tapering of the core reduces total internal reflection; and
first and second light ports defined by regions of the core not covered by the reflective material, positioned such that light can pass through the first port, propagate down the core by total internal reflection at the elongated surface, while an increasing total proportion passes through the elongated surface to be reflected by the reflective material and escape through the second port.

3. A light integrator according to claim 1 wherein the core is of circular lateral cross-section along its length.

4. A light integrator according to claim 1 wherein the first end of the core has a first lateral face.

5. A light integrator comprising:
an elongated tapered solid core having first and second ends and an elongated surface therebetween, down which a decreasing total proportion of light can propagate by total internal reflection at the elongated surface;
a layer of reflective material positioned over at least a portion of the totally internally reflective surface; and
first and second light ports through the reflective material, positioned such that light can pass through the first port, propagate down the core by total internal reflection at the elongated surface, while an increasing total proportion passes through the elongated surface to be reflected by the reflective material and escape through the second port;
wherein the core is not rotationally symmetric and the elongated surface has a straight line portion extending in the longitudinal direction.

6. A light integrator according to claim 5 wherein the second port is elongated along the straight line portion.

7. A light integrator according to claim 4 wherein the first light port is the first lateral face of the core.

8. A light integrator according to claim 1 wherein the core is not rotationally symmetric, the elongated surface has a straight line portion extending in the longitudinal direction, and wherein the second port is elongated along the straight line portion.

9. A light integrator according to claim 1 wherein the layer of reflective material comprises a white particulate material.

10. A light integrator according to claim 9 wherein the white particulate material is barium sulfate.

11. A light integrator according to claim 1 wherein the reflective material is immediately adjacent the elongated surface.

12. A light integrator according to claim 3 wherein:

the core tapers from a first end to a second end, the first end having a lateral first face;

the first light port is at the lateral first face and the second light port is an elongated port on the elongated surface of the core; and the reflective layer is adhered immediately adjacent the elongated surface and comprises barium sulfate particles.

13. A light integrator according to claim 11 wherein the core comprises a synthetic polymer.

14. A light integrator according to claim 12 wherein the reflective layer is adhered to all of the surfaces of the core other than at the first and second ports.

15. A light integrator according to claim 1 additionally comprising an electrically powered light source positioned to direct light into a light port.

16. A light integrator according to claim 5 additionally comprising an electrically powered light source positioned to direct light to a light port.

17. A method of collecting light using a light integrator of claim 1, comprising directing light into the second port which light exists the first port.

18. A scanner, comprising:

a) a light source;

b) a light integrator comprising:

an elongated tapered solid core having first and second ends and an elongated surface therebetween, down which a decreasing total proportion of light can propagate by total internal reflection at the elongated surface;

a layer of reflective material positioned adjacent at least a portion of the elongated surface, which reflective layer is of a first material having sufficient porosity, with pores which are vacant or contain a second material having an index of refraction lower than that of the core, such that the layer reduces total internal reflection in the core less than it would be reduced using a non-porous layer of the same dimensions of only the first material; and first and second light ports defined by regions of the core not covered by the reflective material, the first light port being positioned to receive light from the light source such that light can pass through the first port, propagate down the core by total internal reflection at the elongated surface, while an increasing total proportion passes through the elongated surface to be reflected by the reflective material and escape through the second port;

c) a media holder to position an image bearing medium to be scanned so that the medium receives light from the second port of the integrator; and d) a detector positioned to receive light from the medium being scanned and generate a sequence of signals corresponding to the image.

19. A scanner according to claim 18 wherein:

the core tapers from a first end to a second end, the first end having a lateral first face;

the first light port is at the lateral first face and the second light port is an elongated port on the elongated surface of the core; and the reflective layer is adhered immediately adjacent the elongated surface and comprises barium sulfate particles.

20. A scanner, comprising:

a) a light source;

b) a media holder to position an image bearing medium to be scanned so that the medium receives light from the light source; and c) a light integrator comprising:

an elongated tapered solid core having first and second ends and an elongated surface therebetween, down which a decreasing total proportion of light can propagate by total internal reflection at the elongated surface;

a layer of reflective material positioned adjacent at least a portion of the elongated surface, which reflective layer is of a first material having sufficient porosity, with pores which are vacant or contain a second material having an index of refraction lower than that of the core, such that the layer reduces total internal reflection in the core less than it would be reduced using a non-porous layer of the same dimensions of only the first material; and first and second light ports defined by regions of the core not covered by the reflective material, the second port being positioned to receive light from a medium in a media holder, which light is reflected by the reflective material and propagates up the core by total internal reflection to exit out the first port;

d) a detector positioned to receive light from the first port.

21. A scanner according to claim 20 wherein:

the core tapers from a first end to a second end, the first end having lateral first face;

the first light port is at the lateral first face and the second light port is an elongated port on the elongated surface of the core; and the reflective layer is adhered immediately adjacent the elongated surface and comprises barium sulfate particles.

* * * * *